March 28, 1961 R. P. RAPP 2,976,938

HOE BLADE AND HANDLE ATTACHMENT

Filed April 28, 1958

INVENTOR.
ROBERT P. RAPP
BY
Knox & Knox

United States Patent Office 2,976,938
Patented Mar. 28, 1961

2,976,938

HOE BLADE AND HANDLE ATTACHMENT

Robert P. Rapp, 5185 Edgeware Road, San Diego, Calif.

Filed Apr. 28, 1958, Ser. No. 731,372

4 Claims. (Cl. 172—376)

This invention relates generally to garden tools and more particularly to a hoe blade and means for attachment thereof to a handle.

The primary object of this invention is to provide a blade of triangular cross-sectional shape and small cross-sectional area which is particularly efficient. The principal cutting edge is defined at the juncture of the horizontal bottom face and what will be termed hereinafter the rear face which is inclined at a somewhat critical angle with respect to the handle. The particular disposition of this cutting edge and face results in greater ease of penetration of the soil and makes it possible for the user, employing only a very moderate pressure during the "pull" stroke, to maintain the desired depth of penetration of the soil. It is fully recognized that blades, particularly those of simple plate form, have been shaped in the prior art to facilitate their use and even to achieve this same purpose, ease of penetration and ease of maintaining the desired depth of penetration, but the instant invention is specifically related to this problem as related to the use of a triangular bar type of cutting blade.

Another object of this invention, possibly equally as important, is to provide a novel attachment means for such a blade as that mentioned in the foregoing object. It is proposed by this invention to solve at one time the problems of the greatest reinforcement for the end of the handle consistent with ease of manufacture and ease of assembly, while making provision for simple removal and replacement of the blade. More specifically, this object is concerned with the provision of a yoke which is unitary with the blade and which has portions thereof firmly and easily securable to the end of a handle, the handle being capable of production with the necessary bores and slots all in one general plane.

It is also an object of this invention to provide a garden tool having two cutting edges, the second or front cutting edge being used in push strokes, the angulation being slightly less sharp than that of the rear cutting edge since forward thrust applied through the handle tends to maintain desired depth of penetration of the soil. It is also noteworthy that, partly because the blade is aligned with the handle, this tool can be used with a vertical, chopping movement.

It is a still further object of this invention to provide a garden tool which is ideal for use in plots and beds where it is desired to weed and cultivate without any great horizontal shifting of the soil. The minimized shifting of the soil results from the fact that blade has very small vertical dimension and the soil above the blade is free to pass over the blade and on both sides of the yoke arms subtending the cutting blade.

An object ancillary to the immediately preceding object is to provide a garden tool which can approach the plants very closely for weeding and cultivation purposes without any great horizontal shifting of the soil either toward or away from the plant.

Yet another object is to provide a garden tool which can be used safely for weeding of ivy and other ground cover plants, strawberries and the like since the blade can be pushed and pulled with considerable freedom around such plants without damage.

Finally, it is an object of this invention to provide a hoe of the aforementioned character which is simple, safe and convenient to use and which will give generally efficient and durable service.

With these and other objects definitely in view, this invention consists in the novel construction, combination and arrangement of elements and portions, which will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Figure 1:
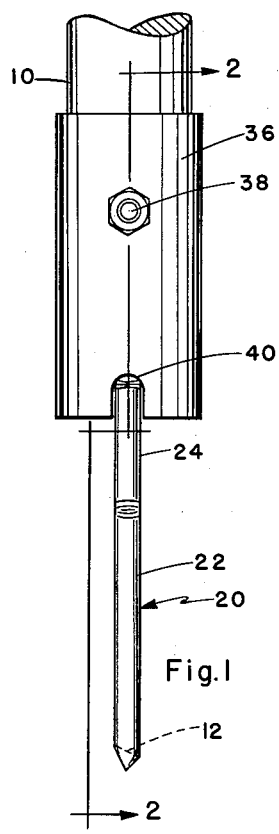
Figure 1 is a side elevational view of a hoe constructed accordingly to this invention, the handle thereof being shown fragmentarily.

Referring now to the drawing in detail, a hoe according to this invention includes, as principal elements, thereof, a handle indicated by the numeral 10 and a blade 12. The blade is triangular in cross-section and has a bottom face 14 which will normally be horizontal when the tool is in use, a front face 16 disposed at approximately 70 degrees to the bottom face 14, and a rear face 18 which is disposed at approximately 62 degrees to the bottom face 14. As will be hereinafter discussed in greater detail, the handle 10 extends at an angle of approximately 107 degrees with respect to the face 18.

Figure 2:
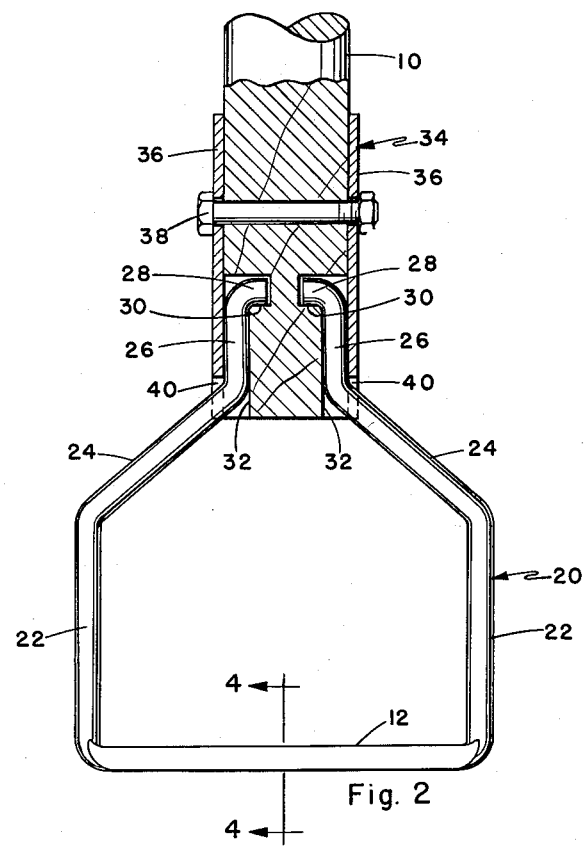
Figure 2 is a vertical sectional view taken substantially on the line 2—2 of Figure 1.
Figure 3:
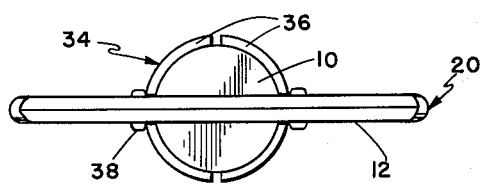
Figure 3 is a bottom plan view and may be considered as taken from the lower end of the tool when the handle is in upright position.
Figure 4:
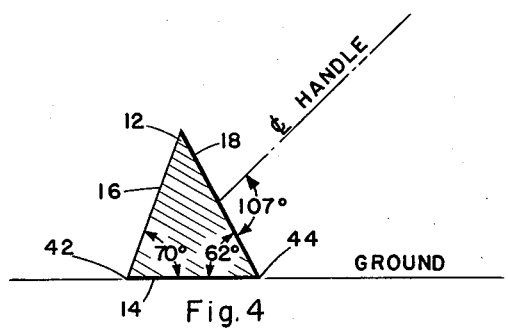
Figure 4 is a somewhat diagrammatic view indicating the cross-sectional shape of the blade and its angular relationship to the ground and the handle when the tool is in use.

Special means is provided for firm securement of the blade to the handle, in the form of a yoke, generally indicated at 20, having a pair of opposing arms 22 which are unitary with the blade 12. These arms are represented as being of cylindrical bar stock and these arms extend in parallel relation from each end of the blade 12. The arms 22 include convergent reaches 24 and straight, parallel coaxial terminals 28 turned inwardly or toward each other, all as well illustrated in Figure 2. The inner ends of the coaxial terminals 28 are slightly spaced apart and are engaged in coaxial bores 30 extending transversely of the handle 10 adjacent the lower end thereof. When the handle 10 is generally cylindrical, as will usually be the case, the coaxial bores 30 extend diametrically thereof. A pair of channels 32 communicate with and extend from the coaxial bores 30 to the said lower end of the handle 10, these channels being in the same general plane as the coaxial bores.

Means is provided to retain the portions 26 and terminals 28 in their proper relationship, this means including a split ferrule 34 having complementary shells 36, held together by suitable means such as a bolt 38 which is illustrated as extending diametrically through the handle, just above the coaxial bores 30. Specifically, the complementary shells 36 reinforce the lower end of the handle against any possible bending or splitting and it should be here noted that the bore for the bolt 38, the coaxial bores 30 and the channels 32 are all in the same general plane, making it considerably easier to produce the handle economically. In the lower ends of the complementary shells 30 there are provided the slots 40 which receive shoulder portions of the convergent reaches 24, at the upper ends of the latter, thus further stabilizing the assembly against bending, twisting and loosening. It will be noted that the above mentioned bottom face 14 and front face 16 define, at their juncture, a front cutting edge 42. The bottom face 14 and rear face 18 define, at their juncture, a rear cutting edge 44. The blade 12 may have a slight curvature, not illustrated, but in any event there exists a somewhat critical angular relationship as between the rear face 18 and the handle. As mentioned above, the angle included by the bottom and rear faces is approximately 62 degrees and since the handle will ordinarily be maintained at approximately 45 degrees inclination to the ground, it follows that the rear face 18 is inclined to the handle at approximately 107 degrees. This relationship has been found to be optimum and it is believed to represent a completely novel approach to the problem of securing optimum ease of penetration and handling of a bar-type blade in a hand tool. The blade 12 is disposed between the planes of the front and rear faces of the yoke 20.

In recapitulation, the above described blade and yoke of unitary construction, formed of a single section of bar stock, and with the ends of this single section of bar stock formed as described above and combined with the above described handle attachment means, results in improved performance of the tool as a whole, significant reduction in cost of manufacture, and optimum ease of assembly and disassembly when necessary to effect replacement or repair.

It is understood that minor variation from the form of the invention disclosed herein may be made without departure from the spirit and scope of the invention, and that the specification and drawing are to be considered as merely illustrative rather than limiting.

Having described my invention, what I claim as new and desire to secure by Letters Patent is:

1. A hoe blade and means for attachment thereof, comprising: a horizontal blade of triangular cross-sectional shape; a blade-supporting yoke comprising opposed arms, each unitary, at the lower end thereof, with one end of said blade; the maximum cross-sectional dimension of the blade being approximately equal to that of said arms, and the axes of said blade and arms being substantially coplanar, whereby said blade and arms are formable from a single section of bar stock with multiple bending thereof in a single plane; said arms having convergent intermediate reaches, slightly spaced, parallel portions, and in-turned coaxial terminals; said blade being disposed between the planes of the front and rear faces of the yoke; a handle having coaxial bores extending transversely into the handle adjacent one end thereof, and opposed channels communicating with and extending from said coaxial bores to said one end of the handle; said coaxial terminals being engaged in the coaxial bores and said slightly spaced parallel portions of the arms being engaged in said channels; and means to clamp said portions in said channels.

2. A hoe blade and means for attachment thereof, comprising: a horizontal blade of triangular cross-sectional shape; a blade-supporting yoke comprising opposed arms, each unitary, at the lower end thereof, with one end of said blade; the maximum cross-sectional dimension of the blade being approximately equal to that of said arms, and the axes of said blade and arms being substantially coplanar, whereby said blade and arms are formable from a single section of bar stock with multiple bending thereof in a single plane; said arms having convergent intermediate reaches, slightly spaced, parallel portions, and in-turned coaxial terminals; said blade being disposed between the planes of the front and rear faces of the yoke; a handle having coaxial bores extending transversely into the handle adjacent one end thereof, and opposed channels communicating with and extending from said coaxial bores to said one end of the handle; said coaxial terminals being engaged in the coaxial bores and said slightly spaced parallel portions of the arms being engaged in said channels; and means to clamp said portions in said channels comprising a two-part split ferrule having two complementary shells shaped to enclose said one end of the handle and to engage said portions of the arms; means to hold said shells in position; and each of said shells having a slot positioned to accept adjacent portions of said convergent reaches.

3. A hoe comprising: a horizontal blade; a blade-supporting yoke comprising opposed arms, each unitary, at the lower end thereof, with one end of said blade; the maximum cross-sectional dimension of the blade being approximately equal to that of said arms, and the axes of said blade and arms being substantially coplanar, whereby said blade and arms are formable from a single section of bar stock with multiple bending thereof in a single plane; a handle and means to secure said arms to said handle; and said blade being triangular in cross-sectional shape with a cutting edge defined at the juncture of a horizontal bottom face and a rear face adjacent said handle, said rear face being disposed so that the angle between the axis of the handle and that part of said rear face adjacent said bottom face is on the order of one hundred seven degrees; said blade being disposed between the planes of the front and rear faces of the yoke.

4. A hoe comprising: a horizontal blade; a blade-supporting yoke comprising opposed arms, each unitary, at the lower end thereof, with one end of said blade; the maximum cross-sectional dimension of the blade being approximately equal to that of said arms, and the axes of said blade and arms being substantially coplanar, whereby said blade and arms are formable from a single section of bar stock with multiple bending thereof in a single plane; a handle and means to secure said arms to said handle; said blade being disposed between the planes of the front and rear faces of the yoke; said blade being triangular in cross-sectional shape with a cutting edge defined at the juncture of a horizontal bottom face and a rear face adjacent said handle, said rear face being disposed so that the angle between the axis of the handle and that part of said rear face adjacent said bottom face is on the order of one hundred seven degees; said blade having a front face and a front cutting edge defined at the juncture of said front face and bottom face, whereby the hoe is also adapted for cutting on forward thrust of the hoe; said front cutting edge and the axis of the handle being substantially coplanar and the hoe thereby adapted for use with a chopping action.

References Cited in the file of this patent
UNITED STATES PATENTS

| | | |
|---|---|---|
| 85,384 | Howell | Dec. 29, 1868 |
| 125,438 | Carroll | Apr. 9, 1872 |
| 168,780 | Porter | Oct. 11, 1875 |
| 240,617 | Smith et al. | Apr. 26, 1881 |
| 341,844 | Hill | May 11, 1886 |
| 1,026,133 | Ulrich | May 14, 1912 |
| 1,315,900 | Allen | Sept. 9, 1919 |
| 1,415,827 | Finley | May 9, 1922 |
| 1,767,918 | Egbert | June 24, 1930 |
| 1,845,222 | Birn | Feb. 16, 1932 |
| 2,237,988 | Halvorsen | Apr. 8, 1941 |
| 2,425,763 | Teigen | Aug. 19, 1947 |
| 2,790,368 | Horton | Apr. 30, 1957 |